United States Patent [19]

Kondo et al.

[11] 4,292,679
[45] Sep. 29, 1981

[54] VARIABLE DIRECTIVITY MOUNTING MEANS

[75] Inventors: Mikio Kondō, Tsu; Hiromitsu Inoue, Kyoto; Hirōshi Ōhashi, Hirakata, all of Japan

[73] Assignee: Matsushita Electric Works, Ltd., Osaka, Japan

[21] Appl. No.: 110,103

[22] Filed: Jan. 7, 1980

[30] Foreign Application Priority Data

Jan. 10, 1979 [JP] Japan .............................. 54-1654[U]

[51] Int. Cl.³ .......................................... H04B 11/00
[52] U.S. Cl. .................................. 367/188; 367/120; 181/171; 179/146 R
[58] Field of Search .................. 367/93, 104, 120, 165, 367/173, 188; 181/150, 158, 171, 173; 179/146 R, 146 E

[56] References Cited

U.S. PATENT DOCUMENTS

| | | | |
|---|---|---|---|
| 1,907,893 | 5/1933 | Stevens | 181/171 |
| 2,235,505 | 3/1941 | Ryan | 179/146 R |
| 2,426,657 | 9/1947 | Williams | 367/104 |
| 2,763,730 | 9/1956 | Paull et al. | 179/121 D |
| 3,506,952 | 4/1970 | Gabor et al. | 367/104 |
| 3,753,219 | 8/1973 | King | 367/173 |

FOREIGN PATENT DOCUMENTS

| | | | |
|---|---|---|---|
| 2618352 | 11/1977 | Fed. Rep. of Germany | 179/146 R |
| 2358815 | 7/1976 | France | 179/146 R |
| 1044819 | 10/1966 | United Kingdom | 179/146 R |
| 1336847 | 11/1973 | United Kingdom | 179/146 R |

*Primary Examiner*—Nelson Moskowitz
*Attorney, Agent, or Firm*—Burns, Doane, Swecker & Mathis

[57] ABSTRACT

Means for mounting a member functioning with a directivity to a mounting station of an associated device or the like. A housing for the member with its functional end surface exposed to the exterior is tapered at the periphery toward the other end to be, for example, hemispherical and rotatably born at diametrally opposed positions adjacent the functional end surface by both ends of a semiarcuate bearing means, the mounting station has a hole including peripherally opposing grooves of a size and shape capable of slidably engaging with the tapered periphery of the housing and receiving semiarcuate body of the bearing means, the housing is inserted in the hole on said the other end side, and the semiarcuate body of the bearing means in the inserted position of the member engages slidably with a resilient means acting to resiliently urge the tapered periphery of the housing against peripheral edge of the hole. In this mounted state, the functional surface of the member is allowed to be manually freely inclined in all 360° directions with respect to the plane of the mounting station to set the directivity and normally stably retained in set inclined position.

7 Claims, 5 Drawing Figures

VARIABLE DIRECTIVITY MOUNTING MEANS

This invention relates to variable directivity mounting means and, more particularly, to improvements in mounting means for a member to be used by properly selecting mounting angle with respect to an associated device or the like so that the directivity of the member will be variable in its mounting position to the device or the like.

Referring to conventional mounting means of the kind referred to, such devices as, for example, wave emitter and reflected-wave receiver in ultrasonic type detectors are so mounted to detector body that the wave emitting or receiving direction is selectively adjustable with respect to the detector body and that the detecting range and responding characteristics for the purpose of the desired use of the detector can be set at installed position of the detector on a wall surface or the like. FIG. 1A shows an example of such conventional variable directivity mounting means, in which a substantially U-shaped arm a rotatably bears such variable directivity member b as, for example, a wave emitter or reflected-wave receiver having therein an ultrasonic wave oscillating element by means of a pair of shaft pins a' provided adjacent opposed tips of a pair of extended legs of the arm a and in turn the arm a is rotatably mounted by a pin c' with respect to a mounting base c at the center of bottom portion of the arm. Therefore, the member b can rotate with respect to the mounting base c about both of a first axis between the pair of opposed pins a' and a second axis of the pin c' intersecting the first axis at right angles. In the case of the ultrasonic type detector, a functional surface b' of the member b emitting ultrasonic waves or receiving reflected waves can be rotated with respect to the mounting base c at a three-dimensionally composed angle within respective ranges of about 180 degrees about the first axis of the pins a' and 360 degrees about the second axis of the pin c', and the functioning directivity of the member b can be selectively set. FIG. 1B shows another example of the conventional mounting means of the kind referred to, wherein a variable directivity member d containing a functional element having a directivity has a spherical outer shape, a mounting base e for mounting the member has a recess e' having a spherical inside surface e'' of an inner diameter slightly larger than the diameter of the member d, and the member d is rotatably held within the recess e' with a functional surface d' of the element exposed out of the recess. In this case, a diameter $L_1$ of circular opening of the recess e' on the outer surface of the mounting base e is made smaller than the diameter $L_2$ of the spherical member d. Therefore, the member d is retained within the recess e' in a manner variable in the directivity achieved by a sliding relation between the spherical outer surface of the member and the spherical surface e'' of the recess.

In these conventional mounting means, however, there are such defects as follows. In the case of FIG. 1A, the directivity of the member b can be adjusted in a considerably wide range but the entire member b must be positioned outside the mounting base c, thus the space required for the mounting is so large that it is difficult to render the associated device smaller in size. Further, the rotary bearing is required at the two places of a' and c' so that the mounting work is complicated and, in order to prevent any natural rotation caused by the weight of the member itself at the respective rotary bearing parts or any externally given vibrations or the like after the mounting and directivity setting, certain fixting means is required or such additional work as tightly fixing each bearing pin after setting the directivity is required. On the other hand, in the case of FIG. 1B, the member d is housed almost entirely within the mounting base and a dimensional advantage is obtained, but the rotation of the functional surface d' of the member is restricted by the opening edge of the diameter $L_1$ smaller than the outside diameter $L_2$ of the member, whereby the variable directivity range is far smaller than in the case of FIG. 1A. In order to stabilize the mounting by locking the sliding relation between the two spherical surfaces after setting the directivity, some locking means is required. Further, in order to house the member of the large diameter spherical body in the recess of the smaller diameter opening, at least a part including the recess of the mounting base must be formed of two-split members and the formation of the mounting means and mounting work still remain complicated.

The present invention is suggested to eliminate these defects of the conventional variable directivity mounting means of the kind referred to.

A primary object of the present invention is, therefore, to provide a variable directivity mounting means wherein the variable directivity mounting to an associated device or the like of a member of which desired functioning directivity in use must be selectively set is simple and the set directivity can be stably maintained.

Another related object of the present invention is to provide a variable directivity mounting means wherein the variable directivity range of the member is kept large.

Yet another object of the present invention is to provide a variable directivity mounting means wherein the device associated with the member can be made smaller in size.

Other objects and advantages of the present invention shall become clear upon reading the following descriptions of the invention detailed with reference to a most preferred embodiment shown in accompanying drawings, in which.

While the present invention will be detailed with reference to the embodiment or illustrated, it should be appreciated that the intention is not to limit the invention to the particular embodiment illustrated but is rather to include all possible modifications, alterations and equivalent arrangements within the scope of appended claims.

Figure 2:
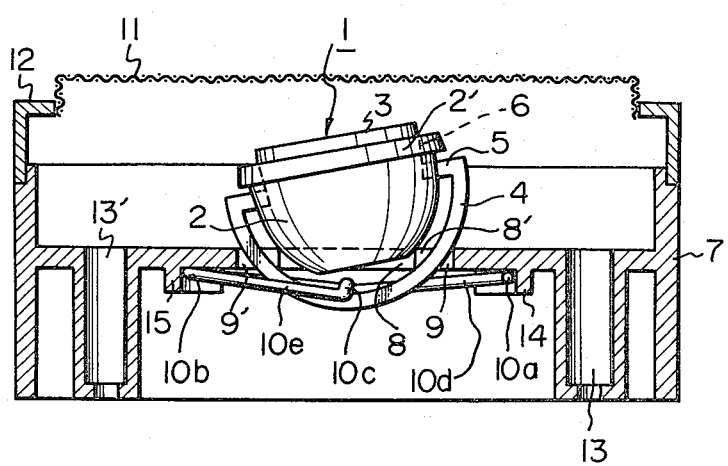
FIG. 2 is a sectioned view of a preferred embodiment of the present invention.
Figure 3:
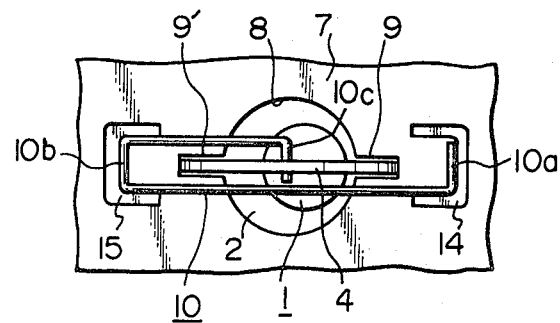
FIG. 3 is a fragmentary plan view of the embodiment shown in FIG. 2 as seen from the mounting surface on the side opposite the functional surface of the variable directivity member.
Figure 4:
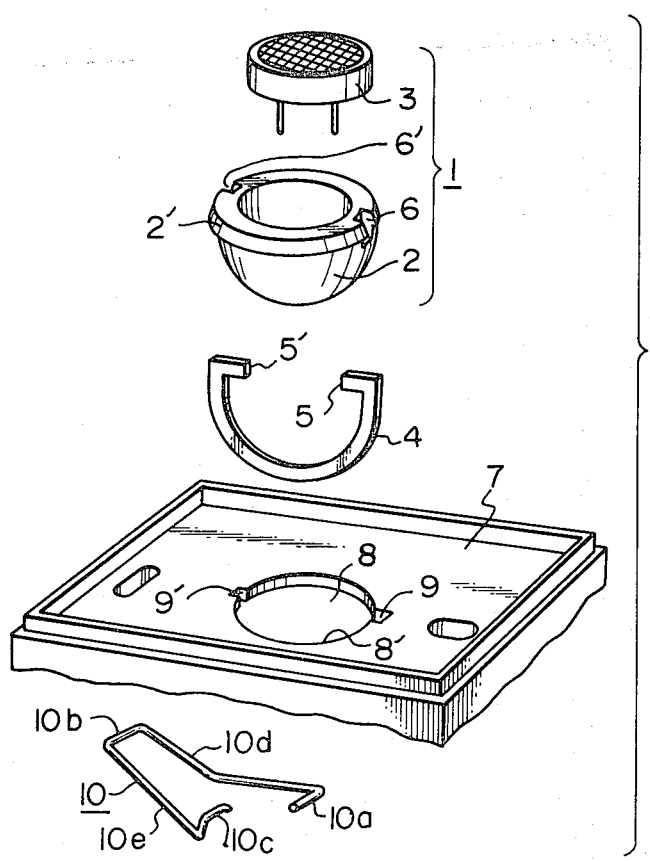
FIG. 4 is a perspective view of the respective elements as disassembled of the embodiment of FIG. 2.

The most preferable embodiment of the present invention shall be explained with reference to FIGS. 2 to 4. A variable directivity member 1 comprises a housing 2 made hemispherical at least on the outer peripheral surface and such element 3 as, for example, an ultrasonic wave oscillator housed within the housing 2 opened at its circular plane of the hemispherical shape and functions with a directivity. The element 3 is fixed to the housing with its functioning surface directed out of the housing 2. In this case, as seen in FIG. 4, the element 3 has in general a contour which is substantially cylindrical or disk-shaped and functions specifically with its circular end surface, and the present invention finds its most advantageous utility when applied to the mounting of the functional element having such somewhat flat shape. When the element 3 is an electric device such as the ultrasonic wave oscillator and has electric connecting terminals or lead wires, these terminals or lead wires are preferably led out of a bottom part of the housing 2, which is made, in the present instance, parallel to the opened end surface as seen in FIG. 2. On the outer periphery of the spherical housing 2, a substantially semi-arcuate mounting arm 4 of a diameter slightly larger than that of the housing 2 is fitted. This arm 4 has a pair of shaft pins 5 and 5' extending as opposed to each other in the diametral direction of the arm at respective end positions of its arc. These pins 5, 5' are inserted respectively in each of a pair of bearing grooves 6 extending from the opening end edge of the housing 2 toward the bottom portion over to positions opposed to each other substantially through the center of the spherical shape of the housing 2, that is, to the diametral positions parallel to the opened end surface so that the housing 2 or the member 1 will be borne by the arm 4 so as to be rotatable about the shaft pins 5 and 5' as an axis. A flat mounting station of a device body 7 of the ultrasonic detector when the element 3 is the ultrasonic wave oscillator has a circular hole 8 to mount the member 1 so as to be variable in the directivity and this hole 8 has a diameter smaller than the diameter of the spherical shape of the housing 2 and communicates with grooves 9 and 9' provided in the flat station to oppose each other in the diametral direction of the hole 8. The width of these grooves 9 and 9' is preferably slightly larger than the thickness of the arm 4. Thus the member 1 to which the arm 4 is fitted is brought into engagement with the mounting station from one side of the station which comprises generally a plate member so that the spherical surface of the element's housing will be inserted partly into the hole 8 and the arm 4 will be also partly received in the grooves 9 and 9'. At this time, a circular end edge 8' of the hole 8 on said one side of the station engages linearly with the spherical surface of the housing intermediately between the bottom portion of the housing 2 and the bearing positions by the pins 5 and 5' and extended end edges of the grooves 9 and 9' are positioned so as to at least lightly contact the outer peripheral surface of the arm 4 or preferably not to contact it.

On the other side of the mounting surface of the mounting station of the body 7, there is provided a spring member 10 for resiliently holding the member 1 fitted with the arm 4 in the engaging position with the circular edge 8' of the hole 8 on said one side of the station. The spring member 10 is formed, in the present instance, of a metal wire so as to be substantially in the shape of J or elongated G so as to have both lengthwise end portions 10a and 10b and an intermediate hook 10c. The length between the both lengthwise end portions 10a and 10b is made a little larger than the distance between the extended end edges of the grooves 9 and 9' in the mounting station. On said the other side of the mounting station, there are provided a pair of projections 14 and 15 opposed to each other preferably with a distance slightly smaller than the length of the spring 10 and at symmetrical positions on the extensions of the grooves 9 and 9', and the spring 10 is fitted between these projections 14 and 15 as resiliently engaged at the both lengthwise end portions 10a and 10b with the projections 14 and 15. The intermediate hook 10c of the spring is positioned substantially in the center of the hole 8 and is resiliently engaged with the inner peripheral surface of the arm 4. In this case, a shorter leg 10c between the hook 10c and the lengthwise end portion 10b of the spring 10 is bent to have an angle with respect to a straight line connecting between the both lengthwise end portions 10a and 10b so that, in the mounting position of the spring, the hook 10c will be in a position separated from the circular end edge 8' further than the maximum projecting position of the arm 4 onto the other side of the mounting station specifically at the inner peripheral surface of the arm 4 as received in the grooves 9 and 9' together with the member 1. When the hook 10c is engaged with the arm 4, therefore, the spring 10 exerts on the arm 4 a spring force acting in the direction away from the mounting station on said the other side thereof, so that the spherical surface of the housing 2 of the member 1 will be resiliently urged against the circular end edge 8' of the mounting station by the spring force transmitted to the member 1 through the shaft pins 5 and 5' of the arm 4. A longer leg 10d between the both lengthwise ends 10a and 10b of the spring 10 is preferably slightly bent substantially in the middle so as to expand in the same direction as of the short leg 10e to provide a resilient force so that, when fitted between the projections 14 and 15, the spring 10 will be resiliently retained by itself between these projections due to the resiliency of the longer leg 10d. Alternatively, the longer leg 10d may be straight, or the spring 10 as a whole may be of an annular form of dimensions enclosing the hole 8 and grooves 9 and 9' or even of a plate spring made, for example, in an E-shape having the hook at its center leg. In all events, important is that the resilient force acting in the said direction is given to the arm 4 on the member 1 and projecting on the other side of the mounting station through the hole 8.

In case the element 3 is an ultrasonic wave oscillator acting as either of an ulstrasonic wave emitter and reflected-wave receiver, a net 11 is stretched on a frame 12 and is fitted to outer peripheral edge of the device body 7 in which the member 1 is mounted and any device to be associated with the functioning element 3 of the member 1 is also housed. If the element 3 is, for example, a light emitter, the net 11 will be of course replaced by glass or the like or even may be omitted. If the element 3 is an emitter of an electromagnetic wave, electric wave or the like, these members 11 and 12 may be omitted. In the illustrated case, the device body 7 has screw holes 13 and 13' so as to be installed to such desired position as a wall surface, ceiling surface or the like by means of screws inserted and driven through these screw holes 13 and 13'. When the device body 7 is thus installed, in a state in which the net 11 if provided is removed, the member 1 is manually rotated to set the desired directivity of the element 3.

In such mounting arrangement of the member 1 on the mounting station of the device body 7 as has been described, the spherical surface of the member 1 is resiliently urged by the spring 10 into contact with the circular end edge 8' of the hole 8 in the station, so that the member 1 can rotate about the shaft pins 5 and 5' of the arm 4 as an axis with a manual force applied while the spherical surface slides along the circular end edge 8'. On the other hand, as the hook 10c of the spring 10 resiliently engages with the circular inner peripheral surface of the arm 4, the arm 4 can also slide along the hook 10c, so that the arm 4 can rotate along or in the direction of its own periphery as guided by the grooves 9 and 9'. As a result, the rotary axis of the member 1 itself defined by the shaft pins 5 and 5' of the arm 4 can be freely inclined or rocked with respect to the plane of the mounting station, whereby the member 1 is allowed to achieve a three-dimensional free rotary motion with respect to the mounting plane, which is obtained by a combination of the rotation about the axis of the pins 5 and 5' and the rocking of the particular axis itself, and the functional surface of the element 3 can be freely inclined with respect to the mounting plane in all directions of 360 degrees with the middle point of the axis as the center. The member 1 thus rotated manually selectively to its position of the desired directivity can be stably retained at the particular position by means of the resiliently urged engagement between the housing's periphery and the peripheral edge of the mounting hole 8. The resilient force of spring 10 is properly determined for achieving both the before described slidings and stable retention.

Here, the grooves 9 and 9' guiding the rotation of the arm 4 act also the prevent a rotation of the arm 4 about an axis passing through the center of the hole 8 vertically with respect to the mounting plane. If, in particular, the element 3 is an electric device as described above and has its connecting terminals or lead wires connected with another electric device housed within the device body, any break of such connection will be effectively prevented by the prevention of the arm rotation about the said vertical axis and eventually of any rotation of the element 3 about its own axis. Here, in the illustrated case, the arm 4 is formed of a material having a square cross-section but may be formed of a wire or the like of a circular cross-section similarly to the spring 10 as illustrated.

As a preferred aspect of the present invention, the member 1 is further provided with a continuous annular flange 2' projecting radially from the spherical surface of the opened end edge of the spherical housing 2. When the member 1 is rotated and a part of the opened end edge of the housing 2 approaches the mounting station, the flange 2' abuts the periphery of the circular peripheral edge 8' of the hole 8 to act as a stopper, whereby any further rotation of the member 1 is prevented. The flange 2' may be in the form of a plurality of projections provided at substantially regular intervals instead of the continuous annular form. By providing such stopper, any excess rotation of the member 1 is restricted and thereby the break of the electric connection is prevented.

While the housing 2 of the member 1 has been referred to as having the spherical outer surface, its peripheral shape needs not be restricted to be spherical, but may be of any of, for example, a conical, polygonal pyramid, semi-ellipsoidal or the like shape which being generally of a tapered shape, that is, a shape in which the diameter is gradually smaller from the end surface out of which the functional surface of the element 3 is exposed toward the other end at which the housing 2 is inserted in the mounting hole 8, whereby the same operation as in the case of the illustrated embodiment can be achieved. Further, the shape of the mounting hole 8 may be of any other shape than the circle, such as an elliptic, polygonal or the like shape which resembles a cross-sectional shape of the housing 2, and the peripheral edge 8' of the mounting hole 8 may also be tapered to be of a shape conforming to the peripheral shape of the housing 2. In any event, it is important that the resiliently engaging relation between the outer periphery of the housing and the peripheral edge of the mounting hole achieves mutually a smooth sliding and stable engagement and, in this respect, it will be appreciated that the resilient engagement between the spherical housing surface and the circular mounting hole edge as in the illustrated embodiment achieves the optimum smooth and stable sliding.

Figure 1A:
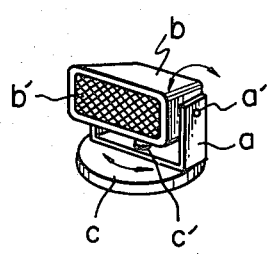
FIGS. 1A and 1B are a perspective view and sectioned view, respectively, showing examples of conventional variable directivity mounting means.
Figure 1B:
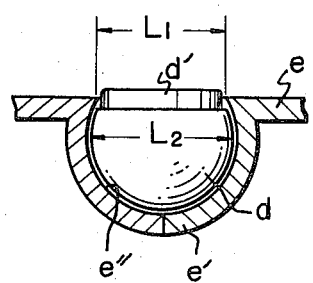

According to the present invention, having such simple structure as has been disclosed, the variable directivity member 1 is inserted at its tapered part on the side of being engaged to the mounting station into the mounting hole 8 in the station and the resilient force is applied through the arm member 4 providing the single rotary axis to the member 1 so as to resiliently urge the tapered part against the inner peripheral edge of the hole 8, whereby the member 1 can be retained in the slidable relation to the hole edge over the entire periphery of the member and the member can be so mounted that the functional surface of the element carried by the member to function with the directivity can be freely inclined in all of the radial directions of the element. Accordingly, the directivity of the member 1 can be very easily adjusted and set in its mounted state and the thus set directivity can be stably maintained. While the range in which the directivity is variable is determined by an even clearance between the peripheral edge of the mounting hole and the opened end edge or its peripheral stopper of the member, this range can be made remarkably larger than in the case of the conventional means as in FIG. 1B since the rotaty center of the member 1 is to be positioned always outside the mounting station. Further according to the present invention, the mounting means and eventually the entire device with which the mounting means is associated can be minimized in size due to that the variable directivity mounting of the member 1 is achieved by means of the mounting hole provided through the mounting station and the respective components disposed all adjacent both sides of the station, that the member is only partly inserted in the hole, and that the extent in which the member is thus inserted is made substantially maximum under given conditions by properly determining the diameter of the mounting hole in relation to the directivity variable range.

We claim:

1. In a means for mounting a member which functions with a desired directivity to a mounting station of an associated device or the like in a manner in which the directivity is variable, the combination comprising a tapered peripheral surface provided on said member, said surface being tapered toward the other end of the member opposite to its one end forming a functional surface of the member, means substantially of a semi-arcuate shape for rotatably bearing at both ends the member at diametrally opposed positions on the periphery thereof, a mounting hole provided through said mounting station and having a diameter smaller than that of the member at said opposed bearing positions so that said hole engages at the peripheral edge with said tapered peripheral surface of the member, a pair of grooves for allowing arcuate body of said bearing means to be freely engaged therein, said grooves being provided in the mounting station to communicate with said hole at diametrally opposed positions of the periphery of the hole, and a resilient means slidably engaged with said arcuate body of the bearing means for providing through the bearing means to the member a force with which the tapered peripheral surface of the member is resiliently urged into said engagement with the peripheral edge of the hole.

2. A mounting means according to claim 1 wherein said tapered peripheral surface of the member is hemispherical, and said mounting hole is circular.

3. A mounting means according to claim 1 wherein said member is provided with means projected out of the periphery of said one end thereof for preventing excess rotation of the member.

4. A mounting means according to claim 1 wherein said resilient means comprises a spring member mounted to said mounting station on a side of the station opposite to that on which said functional surface is disposed.

5. A mounting means according to claim 4 wherein said spring member includes a longer leg mounted resiliently to said mounting station at least across the diameter of said mounting hole and a shorter leg extending to a position substantially opposing the center of the hole and achieving said slidable engagement with the arcuate body of said bearing means.

6. A mounting means according to claim 1 wherein said member comprises a housing having said tapered peripheral surface, and a functioning element housed in said housing and performing a conversion between one of vibratory waves including ultrasonic wave, electromagnetic wave and light and an electric signal corresponding to said wave.

7. A mounting means according to claim 6 wherein said functioning means is an ultrasonic wave oscillator, and said associated device includes an ultrasonic detecting means associated with said oscillator for controlling operations of the oscillator and responding to said operations.

* * * * *